US009249045B2

(12) United States Patent
Gabel et al.

(10) Patent No.: US 9,249,045 B2
(45) Date of Patent: Feb. 2, 2016

(54) TRANSPARENT LITHIUM GLASS-CERAMIC MATERIAL, PRODUCTION AND USE THEREOF

(75) Inventors: Falk Gabel, Schlangenbad (DE); Otmar Becker, Langen (DE); Michael Glasenapp, Duisburg (DE); Jan-Peter Ortmann, Klein Winternheim (DE); Petra Grewer, Duesseldorf (DE); Veit Luther, Hattersheim (DE); Harald Striegler, Ockenheim (DE); Dietmar Wennemann, Albig (DE); Thomas Schuler, Dittelsheim-Hessloch (DE); Thoralf Johansson, Nieder-Olm (DE); Helga Goetz, Jena (DE); Michael Bug, Muehltal (DE); Guenther Siebenhaar, Bodenheim (DE); Gerhard Hahn, Allenfeld (DE); Friedrich-Georg Schroeder, Ingelheim (DE)

(73) Assignee: SCHOTT AG, Mainz (DE)

( * ) Notice: Subject to any disclaimer, the term of this patent is extended or adjusted under 35 U.S.C. 154(b) by 184 days.

(21) Appl. No.: 13/810,847

(22) PCT Filed: Jul. 7, 2011

(86) PCT No.: PCT/EP2011/061478
§ 371 (c)(1),
(2), (4) Date: Mar. 20, 2013

(87) PCT Pub. No.: WO2012/019833
PCT Pub. Date: Feb. 16, 2012

(65) Prior Publication Data
US 2013/0224493 A1 Aug. 29, 2013

(30) Foreign Application Priority Data
Jul. 17, 2010 (DE) .......................... 10 2010 027 461

(51) Int. Cl.
C03B 32/02 (2006.01)
C03C 10/00 (2006.01)

(52) U.S. Cl.
CPC ............ C03B 32/02 (2013.01); C03C 10/0027 (2013.01); C03C 10/0036 (2013.01); *Y10T 428/315* (2015.01)

(58) Field of Classification Search
None
See application file for complete search history.

(56) References Cited

U.S. PATENT DOCUMENTS

| 3,524,748 | A | 8/1970 | Beall |
| 3,573,075 | A * | 3/1971 | Karstetter ......................... 501/7 |
| 3,756,798 | A | 9/1973 | Ernsberger |
| 3,779,856 | A | 12/1973 | Pirooz |
| 4,218,512 | A * | 8/1980 | Allersma ....................... 428/410 |
| 4,391,914 | A | 7/1983 | Beall et al. |
| 4,940,674 | A | 7/1990 | Beall et al. |
| 6,673,729 | B2 * | 1/2004 | Siebers et al. ..................... 501/4 |
| 7,645,714 | B2 | 1/2010 | Kawashima et al. |
| 2005/0076676 | A1 | 4/2005 | Siebers et al. |
| 2005/0252503 | A1 * | 11/2005 | Siebers et al. ................ 126/1 R |
| 2007/0281849 | A1 | 12/2007 | Yagi |

FOREIGN PATENT DOCUMENTS

| DE | 1596910 A1 | 4/1971 |
| DE | 33 45 316 A1 | 6/1984 |
| DE | 10110225 C2 | 7/2003 |
| DE | 10226815 B4 | 9/2004 |
| GB | 1 108 473 A | 4/1968 |
| GB | 1 151 770 A | 5/1969 |
| GB | 1 247 243 A | 9/1971 |
| JP | S59116150 A | 7/1984 |
| JP | H07309636 A | 11/1995 |
| JP | 2001328870 A | 11/2001 |
| JP | 2002087835 A | 3/2002 |
| JP | 2006021947 A | 1/2006 |

OTHER PUBLICATIONS

European Office Action dated Apr. 10, 2014 corresponding to European Patent App. No. 11 738 416.4-1355, 12 pp.
International Search Report dated Dec. 2, 2011 from corresponding International Patent Application No. PCT/EP2011/061478, 3 pages.
English translation of the Written Opinion of the International Searching Authority dated Dec. 2, 2011 from corresponding International Patent Application No. PCT/EP2011/061478, 14 pages.
English translation of Japanese Office Action dated Oct. 21, 2014 for corresponding Japanese Patent Application No. 2013-519033, 5 pages.
English translation of the International Preliminary Report on Patentability dated Jan. 31, 2013 from corresponding International Patent Application No. PCT/EP2011/061478, 16 pages.

* cited by examiner

Primary Examiner — David Sample
(74) Attorney, Agent, or Firm — Ohlandt, Greeley, Ruggiero & Perle, LLP

(57) ABSTRACT

A lithium-containing, transparent glass-ceramic material is provided. The material has low thermal expansion and has an amorphous, lithium-depleted, vitreous surface zone. The zone is at least 50 nm thick on all sides and encloses a crystalline interior, which has high transmission. The material includes a transition region connecting the zone and the interior.

20 Claims, 5 Drawing Sheets

TRANSPARENT LITHIUM GLASS-CERAMIC MATERIAL, PRODUCTION AND USE THEREOF

The invention relates to a lithium-containing, transparent glass-ceramic material with low thermal expansion, having a very largely amorphous, lithium-depleted, predominantly vitreous or glassy surface zone; it relates to a method by which transparent, glass-ceramic materials of this type which are smooth on all sides and exhibit surprisingly high transmission and strength can be produced, and to the use of this glass-ceramic material of the invention.

Transparent glass-ceramic materials with a weakly pronounced intrinsic color, or almost none at all, have nowadays become increasingly important. They should contribute the properties either of coatability/decorability, or those of very high transmission, resulting from a low intrinsic color and a very slightly pronounced scattering. At the same time, high strength is required for the various applications.

The prior art has disclosed a multiplicity of methods for producing solid glass-ceramic materials having low thermal expansion. Such glass-ceramics are employed especially in those areas which are characterized by severe temperature fluctuations and/or mechanical loading, such as, for example, in the form of cookware, as a glass-ceramic cooktop, or in the area of fire protection.

Glass-ceramic materials are produced generally in three steps from a precursor glass or green glass. The "green" glass, shaped to form an article, is heated to a nucleation temperature, where a multiplicity of crystal nuclei are generated in the "green" glass with the aid of nucleating agents. Thereafter the temperature is raised to an optimum crystallization temperature, at which crystal growth takes place on the crystal nuclei formed. The article thus produced is subsequently cooled to room temperature in a variety of ways.

Enhanced strength in a glass-ceramic material is generally achieved by generating different states of stress in the surface and in the interior of the glass-ceramic. For this purpose, the surface of the glass-ceramic material is placed under compressive stress. If a mechanical load then occurs, the surface under compressive stress then prevents the shattering of the glass-ceramic material, up to a limit which is dependent on the material and/or on the production method.

The above-described compressive stress in the surface can be generated by a wide variety of methods. Presented hereinafter are some of the prior-art methods similar to the present invention.

U.S. Pat. No. 3,773,856 discloses a method for producing transparent glass-ceramics with high strength and good thermal shock resistance, using a nucleating agent which changes its valence under a reducing atmosphere, the nucleating agent with the changed valence exhibiting an increased nucleation efficacy. Accordingly, the nucleating step in ceramicization takes place under a reducing atmosphere which is in direct contact with the surface of the starting glass, so that the nucleating agent is reduced at and directly beneath the surface of the glass and hence exhibits an increased efficacy. Then, in the course of the subsequent crystallizing step, the degree of crystallization at the surface of the article is greater than in the interior. The difference in degree of crystallization between, surface and interior of the article results in the desired compressive stress in the article's surface. The reduction, of the nucleating agent can be catalysed by the addition of small amounts of certain metal oxides, such as copper oxide, iron oxide, or manganese oxide, for example. Nucleating agents of the invention are $TiO_2$, $ZrO_2$, or mixtures thereof.

U.S. Pat. No. 4,391,314 discloses a method which, for the purpose of generating the compressive stress in the surface of a glass-ceramic, makes use of differences in thermal expansion coefficient between crystal phase (lithium aluminum silicate crystal phase) and residual glass phase (borosilicate or boroaluminosilicate). Above 500 to 750° C., the residual glass phase dominates the thermal expansion coefficient of the glass-ceramic, since in this phase the crystals formed "float" freely in the matrix of the residual glass phase. As cooling progresses, the contraction of the residual glass phase is substantially greater than that of the crystal phase, and ultimately leads to the crystals coming into contact with one another, while the residual glass phase is only still present interstitially, in pockets. As a result, of progression in cooling, there are compressive stresses or "sticking" at the grain boundaries of the crystals.

The method which is described in U.S. Pat. No. 3,524,748 is based on the differences in thermal expansion coefficient between alpha-quartz and beta-quartz. Beta-quarts has a lower thermal expansion coefficient than alpha-quartz, and forms the principal crystal phase of the surface layer, which is under compressive stress, while beta-quartz constitutes the principal crystal phase, of the interior of the glass-ceramic article. In order to produce such glass-ceramic articles, a starting glass is melted, shaped, subjected optionally to nucleation, and heated to temperatures between 1000 and 1250° C. The residence time at these temperatures is long enough to ensure a uniform crystallization whose principal phase is beta-quartz. Quoted for example for the nucleation at 800 to 950° C. are one to eight hours; for the crystallization phase, two to eight hours. The surface of the article is subsequently quenched within from 10 to 60 seconds to temperatures below 573° C., in order to prevent the beta-quartz produced converting back into alpha-quartz near the surface. The interior of the glass-ceramic article is cooled more slowly, and so there is a conversion into alpha-quartz there. Owing to the higher thermal expansion coefficient of alpha-quartz, the interior of the glass-ceramic article contracts to a greater extent on cooling than does the beta-quarts surface layer, and hence generates a compressive stress in the surface layer. Glass compositions suitable for the production of glass-ceramic articles of this kind are those comprising $SiO_2$, $Al_2O_3$, $MgO_2$, and $ZrO_2$ as principal components. There may be up to 15% by weight of ZnO present, and also small amounts of $Li_2O$, $Nb_2O_3$, $Ta_2O_2$, CaO, BaO, $TiO_2$, and $B_3O_3$, with the latter compounds accounting for not more than 4% by weight in total.

Patent specification U.S. Pat. No. 4,940,674 teaches the production of transparent, substantially hazing-free glass-ceramic articles with a low thermal expansion coefficient, the principal components of their starting glasses including $Li_2O$, $Al_2O_3$, $SiO_2$, and $B_2O_3$, with the possible addition thereto of $TiO_2$ and/or $ZrO_2$ as nucleating agents, and of very small amounts of $Cr_2O_3$ as a specialty nucleating agent for the hazing-free production of transparent glass-ceramics. In addition there are small amounts of glass-modifying oxides of the group $K_2O$, SrO and/or BaO.

Patent specification DE 101 10 225 C2 discloses a glass-ceramic, support material for coating with a mirror layer, comprising glass-ceramic and a vitreous surface layer which comprises at least $Na_2O$ and/or $K_2O$ and has a surface roughness, without polishing, of $R_a$<50 nm. The composition there is achieved by the formation of a vitreous surface layer which is enriched with the components $Na_2O/K_2O$ and has a thickness of up to 1.5 µm. The effect, of the vitreous surface layer is that the increase in surface roughness in the glass-ceramic relative to the starting glass is less than 10 nm.

Accordingly, therefore, a vitreous surface layer with very low roughness, without polishing, is said to form, for the production, on this smooth layer as a support surface, of coatings with optimum mirror effect, especially for reflectors.

The production methods known from the prior art are costly and complicated, necessitate specialty nucleating agents, and require composition components some of which are environmentally debatable.

The problem addressed by the present invention is therefore that of
1. providing glass-ceramic products which have a low-Li zone on all sides,
2. finding a method which allows the production of a glass-ceramic sheet which possesses, even on its reverse face, adjoining the support plate during ceramicization, an Li-depleted surface layer which corresponds approximately to the layer density of the Li-depleted layer on the front face of the sheet (or in the marginal region) (300 to 700 nm), but is at least 50 nm and <5000 nm thick, with beta-quarts solid solutions (BQSS) as the dominant crystal phase in the interior, the method being relatively quick to implement with increased quality, and the articles produced nevertheless having high transmission levels in the visible range. High transmission levels in accordance with the invention mean transmissions which in the visible wavelength range are better than 0.75 at 400 nm, >0.845 at 450 nm, >0.893 at 550 nm, >0.90 at 600 nm, and >0.90 at 700 nm wavelength, based on a wall thickness of 4 mm.

This problem is solved in a surprisingly simple way by a lithium-containing, transparent glass-ceramic which is smooth on all sides and exhibits low thermal expansion, with an amorphous, lithium-depleted, vitreous surface zone which is at least 50 nm thick on all sides and surrounds or encloses a crystalline interior or inner region to which it is joined by or connected via a transition region, and has high transmission, and by the subject matter of the further independent claims. Advantageous embodiments and developments of the invention are specified in the dependent claims.

In the case of the glass-ceramic material according to the present invention, a vitreous surface zone $d_{gl}$ relative to the total wall thickness of the glass-ceramic article produced, $d_{tot}$, is typically less than $1.25*10^{-3}$, with a glass-ceramic article wall thickness of for example 4 mm and with a maximum vitreous surface zone thickness of 5000 nm.

The thickness of the vitreous surface zone in this case is in the range from 50 to 5000 nm, preferably from 250 to 3000 nm, and more preferably from 300 to 1500 nm.

According to the invention, the vitreous surface zone is connected to the predominantly crystalline interior region by a transition region.

A transition region mediates between the vitreous marginal region and the crystalline interior of the glass-ceramic article, with an increase in the number or proportion of the crystals, relative to the vitreous matrix, in the direction of the crystalline interior. The transition region between the vitreous marginal region and the crystalline interior of the article here is, advantageously, very small; by virtue of the method of the invention, it can be maintained at less than 200 nm in thickness. A preferred transition region, however, has a thickness of not more than 100 nm. A maximally small transition region between vitreous marginal region and crystalline interior increases the transmission of the completed article.

The rule is that the sharper the transition between the two layers, the higher the transmission.

In one preferred embodiment of the invention, the glass-ceramic material has a principal crystal phase which comprises more than 50% by weight of beta-quartz solid solutions (BQSS), the beta-quarts solid solutions of the crystalline interior region having a lattice constant a in the range from 5.18 Å to 5.19 Å. On account of particularly low differences in refractive index between crystals and residual glass phase, glass-ceramic materials which comprise predominantly beta-quartz solid solutions are notable for particularly high transparency.

By amorphous (vitreous) surface zone in an LAS glass-ceramic material, the invention means a zone or layer, directly at the glass-ceramic surface, which in contrast to the interior, i.e., to the micro-structure beneath this marginal layer, does not have the typically on average 20 nm to 100 nm BQSS crystals (or others), but is instead predominantly amorphous. This substantially amorphous surface zone comprises, for BQSS or KSS (keatite solid solutions) as the principal crystal phase, not more than 10% by volume of crystals; in other words, at least 90% by volume of the surface zone consists of a vitreous matrix (detectable via glancing-angle x-ray diffraction). The amorphous surface region more preferably comprises less than 1% by volume of crystals. In contrast, crystals make up a fraction, in the substantially crystalline interior of the glass-ceramic article, of at least 70% by volume, preferably of at least 80% by volume, more preferably at least 90% by volume.

This layer is detectable either by "glancing-angle x-ray diffraction" or else by way of preparation of a cross section and electron diffraction in a transmission electron microscope (TEM), or indirectly in a scanning electron microscope (SEM). For the SEM analysis, the cross section is chemically etched beforehand with diluted hydrofluoric acid. The hydrofluoric acid attacks the glass phase of the LAS glass-ceramic much more strongly than it does the BQSS/KSS crystals. In this way, the contrast of the crystals is boosted, and in the SEM it is possible to make out the grain boundaries of the crystals, allowing the skilled person to make a distinction on the basis of the structural differences between crystalline interior and vitreous surface region that have been visualized by x-ray diffraction and SEM/TEM (FIG. 1).

An Li-depleted surface zone in an LAS glass-ceramic material is understood to be a layer at the surface in which the amount of lithium is only 5% to 20% of the figure for the lithium content of the glass-ceramic material in the crystalline interior. The Li content in an LAS glass-ceramic material is defected typically by depth profile measurements by means of secondary ion mass spectroscopy (SIMS, or Time of Flight SIMS; TOF SIMS, FIG. 2).

The glass-ceramic article of the invention typically has a high transmission and transparency, especially for wavelengths in the visible spectrum, the transmissions for the wavelength ranges being preferably greater than 0.75 at 400 nm, greater than 0.845 at 450 nm, greater than 0.893 at 550 nm, greater than 0.90 at 600 ran, and greater than 0.90 at 700 nm, standardized for a disk with a thickness of 4 mm.

The present invention also encompasses a method for producing highly transparent, high-strength glass-ceramic articles. The method used for producing the glass-ceramic materials of the invention is notable specifically for its short residence times in the nucleation phase and crystallisation phase, and also for the possibility of production even without forming-gas. The method overall is more efficient than comparable methods from the prior art.

For this method, a starting or "green" glass containing nucleating agents is provided and the starting glass is subjected to a temperature treatment, where the starting glass is first heated to a nucleation temperature in the range from 700 to 810° C. and the residence time in this temperature range is between 3 and 120 minutes, and then the starting glass with the nuclei formed is heated from the nucleation temperature to 810 to 880° C., the heating rate being from 0.1 to 5.0K/min, and then the at least partly ceramicized starting glass is heated to temperatures in the range between 880 and 970° C., the at least partly crystallized starting glass being held, after heating, for a number of minutes, in this temperature range, and the duration of this operating step being between 1 and 45 minutes, concludingly, the glass-ceramic material is cooled at least to below 600° C., the cooling rate being at least 5 K/minute, and where the ceramicization is carried out with a defined kiln air moisture content and the ceramicization is carried out using a support plate which on its side in contact with the starting glass/the glass-ceramic (contact side) is provided with supply and removal lines for the ambient gases (e.g., kiln atmosphere).

The glass-ceramic articles produced with the method of the invention have a very high transparency, and so, for example, even in a laminate, still meet the requirements for vehicle glazing. Furthermore, they can also be of high strength and thus can be used as a glass-ceramic for protective applications.

It has now been discovered that high-strength, high-transparency glass-ceramic articles can be produced by means of a particular combination of nucleation and crystallisation temperatures with particular residence times and with a rapid cooling rate. An improvement can be observed, surprisingly, in the abovementioned properties for starting glasses of various compositions. In particular in the context of the specified temperature range and time range, therefore, the method of the invention can be employed for different glass-ceramic materials. This is especially advantageous when different glass-ceramic materials are produced on the same manufacturing line, since there is no need for costly and inconvenient adaptation of the method parameters. Particular advantages in respect of transparency and strength were found especially for lithium aluminosilicate glass-ceramic materials (LAS glass-ceramics). Accordingly, in an advantageous embodiment of the invention, a lithium aluminosilicate starting glass is ceramicized.

A particular advantage of the method of the invention is the homogeneous crystallization, by which is meant a uniform distribution of the crystals or crystallites in the residual glass phase, and very similar particle sizes. A distribution of this kind reduces light scattering and the differences in refractive index between the individual phases of the glass-ceramic material, and increases the transparency of the glass-ceramic article produced.

The crystals therefore have particle sizes whose standard deviation is less than +/−5%, preferably less than +/−3%, and very preferably less than +/−2%.

LAS glasses according to the invention are glass-ceramics having a compositional range (in % by mass) of 50-75.0 $SiO_2$,
15-28.0 $Al_2O_3$,
0-2.0 $B_2O_3$,
0-1.0 F,
2.0-6.0 $Li_O$,
0-6.5 CaO+SrO+BaO,
0-7.0 $TiO_2$,
0-5.0 $ZrO_2$,
0-4.0 ZnO,
0-3.0 $Sb_2O_3$,
0-3.0 MgO,
0-3.0 $SnO_2$,
2.0-7.0 $TiO_2+ZrO_2+SnO_2$,
0-8.0 $P_2O_5$,
0-1.5 $As_2O_3$,
0-1.0 $Nd_2O_3$,
0-4.0 $Na_2O+K_2O$, the respective fractions being situated within the ranges indicated hereinafter,
0-4.0 $Na_2O$,
0-4.0 $K_2O$, and also customary refining agents such as $Sb_2O_3$, $As_2O_3$, $SnO_2$, $Ce_2O_3$, fluorine, bromine, and sulfate, with a water content, of 0.011-0.08% by mass.

The crystallised body is subsequently cooled to at least 600° C. at a cooling rate which at least at times is at least 5 K/minute, preferably 10 to 20 K/minute. Excessively high cooling rates, of the kind used for quenching, for instance, prove, however, to be deleterious in respect of the transmission and scattering. The cooling rate ought therefore not to exceed 100 K per minute. It has emerged that glass-ceramic articles cooled at cooling rates of 10 to 20 K/min exhibit particularly good properties in respect of transmission and transparency.

In comparison to customary ceramicization methods, advantageously, the residence times both in the nucleation phase and in the crystallization phase are short, and this leads to distinct savings in the energy required, and increases the throughput.

Large temperature discrepancies between top and bottom faces of the article to be ceramicized may result in inhomogeneities in the glass-ceramic article produced. Inhomogeneities in this context mean, for example, significantly different crystallite sizes, the nonuniform distribution of the crystallites within the article, or else the formation of crystal phases with different, chemical compositions, and also different refractive indices for the phases in the glass-ceramic material. These inhomogeneities may in turn impact adversely on the quality, more particularly on the desired high transparency, of the glass-ceramic article of the invention.

The temperature difference between top and bottom faces of the green glass for ceramicization, during nucleation and ceramicization, ought therefore to be maintained at 10 K, preferably <3 K, and more preferably <1 K.

The rapid cooling after the crystallization phase leads, advantageously, to the formation of a substantially vitreous marginal layer, surrounding completely, or at least partly, a substantially crystalline interior. The thickness of the vitreous layer in this arrangement is typically in the range from 50 to 5000 nanometers, usually 250 to 3000, preferably in the range from 300 to 1500 nanometers. The substantially vitreous marginal region or the substantially vitreous marginal layer, hereinafter sometimes just called "vitreous marginal region", comprises not more than 10% by weight of crystals—in other words, at least 0.90% by weight of the marginal region consists of a vitreous matrix. With particular preference, the vitreous marginal region comprises less than 1% by weight of crystals. Conversely, crystals account for a fraction of at least 50% by weight, preferably at least 80% by weight, more preferably at least 90% by weight of the substantially crystalline interior of the glass-ceramic article, sometimes below just called "crystalline interior" or "crystalline interior region".

Influenced definitively by the low kiln moisture content at ceramicization, as envisaged in a development of the invention, it is possible in particular for a vitreous marginal region to be formed that has a lower refractive index than the crystalline interior. In this way, the vitreous marginal region may also have an antireflective effect, hence allowing the additional application of an antireflection layer to be done away with, in the case of vehicle glazing, for example, and hence providing the possibility for a significant reduction in costs through savings in material and time. The formation of this vitreous marginal region may with particular advantage increase the transparency of the completed article by around 1% in absolute terms in the visible wavelength range.

In particular, the rapid cooling in combination with the "dry kiln air" described below permits an improvement in transparency by up to 1% in absolute terms in the wavelength range above 400 nm as compared with a conventional, slower cooling rate of 3 K/minute.

In the case of a glass-ceramic material according to the present invention, there is a difference in refractive index between the glass phase and the crystals in a range between 0.001 and 0.05, with the vitreous surface zone having a lower refractive index than the predominantly crystalline interior region of the glass-ceramic material, and, by virtue of the ceramicization and subsequent cooling, the difference in the refractive indices between the residual glass phase of the surface zone and the crystal phase of the interior region being less than +/−0.3, preferably 0.1.

Advantageously, one development of the method of the invention operates with two nucleating agents, preferably $TiO_2$ and $ZrO_2$. It is also possible, however, to use nucleating agents such as, for example, only $TiO_2$, only $ZrO_2$, $SnO_2$ and oxides of chromium, which is used frequently for reducing the hazing.

The invention is based on the assumption that the residual glass phase plays an important part in the hazing of transparent glass-ceramic materials, initiated either by the difference in refractive index between residual glass phase and crystal phase, and/or by the influence of the residual glass phase on the resulting crystal size. It was assumed that the hazing is caused by relatively large crystals, since relatively large crystals resulted in increased light scattering. The objective of the invention was therefore to generate as many as possible crystals which are as small as possible, for which the addition of $Cr_2O_3$ as a catalyst for the nucleation was not necessary.

In one advantageous development, the transparent glass-ceramic material of the invention comprises 0.013% to 0.23% by weight of $Fe_2O_3$, preferably 0.013% to 0.014% by weight, and more preferably 0.013% to 0.04% by weight of $Fe_2O_3$. In transparent glasses or glass-ceramic materials, generally, even high levels of $Fe_2O_3$ are undesirable, since they can lead to a brown tinting of the article produced. For this reason, these products are frequently produced using raw materials that are low in iron and are therefore also comparatively expensive. In contrast to this, in this embodiment according to the invention, which can be used, for example, as a glazing sheet in the vehicle industry, a certain Fe content is tolerable on account of the otherwise high transmission.

In accordance with one development, a certain Fe content is in fact expressly desired, since the brown tint produced advantageously hinders the passage of UV light (wavelengths less than 400 nm) and thus attenuates, or even prevents, the damaging effect of the UV light.

The specific combination, in accordance with the invention, of temperature program, residence time, and kiln moisture content improves more particularly the properties of transparency, allowing a considerable reduction in scattering to be achieved by comparison with conventional ceramicization methods. The improved effect is particularly evident if the article of the invention is used in a laminate—for example, as a particularly high-strength vehicle glazing sheet, since in this case the transparency gain adds up in line with the number of individual sheets used for the laminate.

With particular advantage in relation to low scattering in the completed glass-ceramic article, the beta-quartz solid solutions in the crystalline interior region have a lattice constant, a in the range between 5.18 and 5.19 Å.

The glass-ceramic article of the invention differs from conventional glass-ceramic articles essentially by virtue of the aforementioned high transparency in the visible spectrum.

According to the invention, the ceramicization is carried out at a kiln air moisture content of not more than 10% by volume, preferably at not more than 5% by volume, and very preferably at not more than 2.5% by volume.

This produces an LAS glass-ceramic material having on its surface an amorphous zone which is depleted of lithium ions and is 50 nm thick on all sides, with the ion exchange that is necessary for the development of the low-lithium-content, amorphous zone taking place during the ceramicization, by removal of water or hydrogen or supplying of water or hydrogen, exploiting the difference in partial pressure between the developing glass-ceramic and its environment.

The ion exchange that is necessary for the development of a low-Li amorphous surface zone proceeds during the ceramicization process, and the thickness of the zone is adjusted via the waiter content or hydrogen content of the kiln atmosphere during this process.

The water content of the kiln atmosphere is set in interaction with the OH content of the glass-ceramic during the process, depending on the water content of the starting LAS glass and on the desired thickness of the low-Li, amorphous surface layer, at >=0.05% by volume and <=25% by volume.

The water content of the kiln atmosphere is set during the process, depending on the water content of the starting LAS glass and on desired thickness of the low-Li, amorphous surface layer, at >=0.05% by volume and <=10% by volume.

It has now been found further that, the objectives are achieved in a simple way if the ion exchange is prepared prior to the process of ceramicization to form the glass-ceramic, by adjustment of the water content $C_{H2O}$ in the starting glass, and has taken place during the ceramicization. This process may be assisted very effectively, according to the invention, by removal of water or supplying of water during the ceramicization process. The ion exchange takes place on the surface of the glass-ceramic material here preferably in a layer thickness of up to 600 nm.

Surprisingly it has emerged that the mechanism which leads to the formation of the vitreous, Li-depleted surface layer is attributable essentially to the influence of water and/or hydrogen in the glass interior on the crystallization temperature of the crystals.

The glass-ceramic material according to the present invention, in accordance with the extent of its depletion of Li ions on its surface, has an increasingly vitreous protective layer. The formation of the vitreous protective layer may be described by means of evaporation processes during the ceramicization and the influence of water and/or hydrogen on the crystallization temperature in other words, the greater the number of OH groups or the greater the amount of hydrogen incorporated in the starting glass of the glass-ceramic material, the greater the extent to which, with a given ceramicization program, the crystallization temperature will be lowered.

According to the invention, the starting glasses for the respective glass-ceramic material deliberately contain water and/or hydrogen that can be delivered to the kiln atmosphere during the temperature process in the vicinity of the surface.

Depending on the way in which the removal of water is controlled and the water content of the starting glass is adjusted, the surface zone may to different extents and depths become depleted in. OH groups, relative to the interior, or else become enriched with water, as well, if the environment, is extremely moist.

If a surface zone has been depleted of OH groups relative to the interior, the crystallization there is shifted to higher temperatures than in the interior, and the crystallization begins in the interior. As bulk crystallization commences, Li migrates from the "dewatered" surface layer into the interior, and, conversely, elements which are not incorporated into the BQSS, such as Na, K, Ca, and Ba, diffuse into the Li-depleted surface layer.

The surface layer, modified as a result of these diffusion processes, does not lead to BQSS formation in the abovementioned temperature range up to about 900° C.; a vitreous surface layer remains.

The higher the OH content and/or the higher the hydrogen content of the starting glass, the thicker can be the vitreous, Li-depleted surface layer formed. Nevertheless, the extent of depletion is also dependent on the composition of the glass-ceramic material and on the temperature regime during the ceramicization.

If the removal of water is hindered or prevented, conversely, crystallization may begin at the surface, or there may be a complete absence of the vitreous surface layer, which then results in a very strong tendency toward cracking on exposure to corrosive substances in subsequent service.

According to the invention, in order to control the parameters described above, it is preferred to use an electrically heated kiln, preferably in the form of a tunnel kiln, more particularly of a roller kiln for the ceramicization.

For the ceramicization a support plate is used which on its side in contact with the glass-ceramic material (contact side) is provided with supply lines and discharge lines for ambient gases (e.g., kiln atmosphere).

During the ceramicization process, the glass sheets are stored on a smooth underlayer (support, plate) which serves as a firing aid. This may take place either in a charging kiln, or else during transport through a roller kiln. In both types of kiln a ceramicization may take place—that is, a heating procedure in 1 to 5 hours to 750 to 980° C., to form a planar plate with beta-quartz solid solutions (BQSS) as principal crystal phase and with the desired crystallinity (50% to 90%) and the desired, crystallite size (20 nm to 100 nm).

A support plate, made of keatite is described in, for example, U.S. Pat. No. 7,055,848 B2 and also in the corresponding DE 102 26 815 B4. The side of the glass-ceramic sheet that lies atop this support plate is the reverse side. The surface of the glass-ceramic's reverse side may have small scratches, scars or else adhering particles as a result of the contact with the substrate, and in the end product is therefore used preferably as the reverse side, facing away from the user.

This reverse side or bottom face of the sheet is the side on which the coloring, underside coating is performed in the case, for example, of use as a transparent cooktop, and which represents the side facing away from the viewer when it is installed as a hob, whereas the top face of the glass-ceramic sheet (usually decorated additionally in the course of the ceramicization process) faces the viewer. In the case of use, for example, as a chimney viewing window, the reverse side of the relevant LAS glass-ceramic sheet may be exposed to aggressive waste gases in service. In the case of use, for example, as a laminated-sheet fire protection system, the reverse sides of the relevant LAS glass-ceramic sheets are subjected to the laminating operation. In the case of use as a support plate for the solar industry, the relevant side may have been subjected to ion exchange procedures, for example, or may come into contact with other glasses in an electrical field.

The support plates may consist of a ceramic material or else of a glass-ceramic material. The latter plates are typically what are called substrate plates made from glass-ceramic materials which comprise chiefly keatite solid solutions (KSS).

During the ceramicization in an electric kiln or gas kiln, with a defined OH content and/or hydrogen content of the kiln atmosphere, and depending on the OH content or H content of the starting LAS glass, a lithium-depleted, usually predominantly amorphous (vitreous) surface zone with a thickness of 200 nm to 2000 nm is formed on the top face of the LAS glass-ceramic sheet in question, if the abovementioned beta-quartz solid solutions are present as a principal crystal phase in the resultant glass-ceramic microstructure.

By controlling the OH content and/or the hydrogen content of the kiln atmosphere it is possible to adjust the thickness of the lithium-depleted, usually predominantly amorphous (vitreous) surface zone to desired levels. Thinner layers are obtained by high OH contents (1% to 20% by volume OH content in the kiln atmosphere), and thicker layers by low OH contents of the kiln atmosphere (0.1% to 1% by volume).

In principle it is possible to use not only OH containing compounds but also hydrogen in order to achieve the desired Li-depleted layers. In accordance with the present, invention, however, $H_2O$ is employed, since the handling and storage of $H_2O$ is simple and environmentally benign.

Unfortunately, it has emerged that on the reverse side of the sheet to be ceramicized, the side which is in contact with a support plate (e.g., smooth plate of glass-ceramic) during the ceramicization procedure, this Li-depleted surface zone, only in the marginal regions, up to a distance of approximately 100 mm to 200 mm from the edge of the sheet, is formed with a similar thickness as on the top face (in the case of BQSS ceramicization, on average 300 to 700 nm), whereas, at a greater distance from the margin, the Li-depleted layer only has a thickness of on average 50 nm to approximately 100 nm.

As a result of this inconsistent thickness, which is inadequate for certain applications, on the part of the surface zone, depleted of Li ions, of the LAS glass-ceramic sheet reverse side, for example, the adhesive strength and scratch resistance of an applied, coating is locally reduced, or the reflection-reducing effect of the low-Li layer is locally absent, or the service life of a support plate for the solar industry is significantly reduced. The effect on the adhesive strength and scratch resistance is manifested in a particularly disruptive way if the reverse side has a coating which in firing or in service is exposed to temperatures of 600° C. to 900° C.

According to the present invention, therefore, substrates which bear air or gas supply means are used, during the ceramicization procedure, and in this way the bottom face of the glass-ceramic material to be ceramicized, as well, is in complete communication with the kiln atmosphere present on the top face or at the margin.

This surprisingly simple solution to the problem can be realised in a variety of ways. For instance, the supply of air or gas may be brought about by providing the support plate, on its side in contact with the sheet to be ceramicized, with grooves through which air or gas is able to pass from the marginal regions of the support plate to those parts of the sheet that are resting further inward on the support plate. In this way it is possible to achieve approximately the same condition of the kiln atmosphere beneath the glass-ceramic sheet as well, as that on the top face and at the margin of the glass-ceramic sheet.

In order to achieve effective access by air or gas to the bottom face of the sheet, the grooves are preferably disposed parallel to the narrow side of the support plate and hence also of the sheet (i.e., transverse grooves), since in this way the diffusion pathways for the air or the gas are shorter than if the grooves were to run along the wide side, of the support plate (i.e., longitudinal grooves). The grooves may have a width of 0.1 mm to 20 mm and may be 0.05 mm to 2 mm in depth. If the grooves are too wide, visible deformations may occur on the reverse side of the sheet, as a result of partial sagging of the sheet into the grooves. Unless this is desirable for design reasons, the groove width should be selected to be sufficiently narrow that such deformations virtually do not occur. Depending on the ceramicization program, the ceramicization temperature, the composition of the glass-ceramic material to be produced, and the optical requirements affecting the glass-ceramic plate, the groove width which is optimum for the individual ceramicization process can be determined by means of a few preliminary tests, with the aid of the guideline values given below. If the grooves are too shallow, an optimum supply of air or gas may no longer be ensured; if they are too deep, the strength and/or the lifetime of the support plate may be reduced. It has emerged that good results are obtained if the cross section of the grooves is 0.1 to 2.5 mm$^2$. Larger cross sections do not carry any improvement; smaller cross sections may result in the air supply becoming too weak. Groove widths of 1 mm to 5 mm and groove depths of 0.2 mm to 0.5 mm have proven particularly favorable. In order to achieve a uniform thickness of the surface zone depleted of Li ions, preliminary tests ought to be used to clarify that lateral distance from the groove up to which the desired thickness of the low-Li zone occurs. The thickness may be determined, for example, on a cross section in a scanning electron microscope (SEM). The support plates are subsequently provided with grooves whose mutual spacing is such that the desired minimum thickness of the low-Li zone is established over the entire bottom face of the ceramicized sheet. As an indicator it can be stated that for a low-Li zone approximately 300 nm thick, the grooves ought to have a distance from one another of 10 mm to 150 mm, more particularly of 20 mm to 100 mm. An advantageous point with regard to the production costs of the glass-ceramic materials to be ceramicized on these grooved support plates is that these grooves can foe either milled in (mechanically or by sandblasting) or else embossed in by textured rolls or dies during the hot shaping of the support plates.

A further possibility for air supply between support plate and glass(-ceramic) plate is to provide the top face of the support plate with studs. Air or gas is able to enter into the interstices between the studs, and bring about the desired lithium depletion of the bottom face of the overlying glass-ceramic plate. The number and design of the studs on the support plate must be selected such that the glass(-ceramic) sheet lies on a maximally large number of studs, in order to prevent or minimize any deformation. Through the large number of the studs of equal height, a large number of air or gas supply ducts results as well, and so the studs can be low. Studs which have a diameter of 0.5 mm to 100 mm, a height, of 0.05 mm to 2 mm, and a distance from one another of 1 mm to 120 mm are generally highly suitable. As an indicator for optimization tests it may be stated that a support plate which has studs with a diameter (at the base) of 1 mm to 2 mm, a height of 0.1 mm to 0.5 mm, and a distance from one another of approximately 2 mm produces an amorphous, low-Li layer approximately 500 nm thick on the ceramicization contact side in the case of an LAS glass-ceramic with a thickness of 4 mm. By means of particularly pointy studs it is possible to achieve significant imaging of these studs in the completed glass-ceramic sheet, thus allowing particularly esthetic, effects to be obtained.

Furthermore, air supply may be implemented by roughening the surface of the support plate. This roughening may be generated, for example, by chemical etching, sandblasting or abrading. In order to generate a low-Li layer of approximately 200 nm even in the case of relatively large (e.g., 400×400 mm) sheets, a roughness RMS of approximately 10 μm to 50 μm is required. Greater roughnesses RMS of 50 μm to 200 μm give rise to Li-depleted layers having a thickness of 200 nm up to 500 nm. Generally speaking, depending on the desired layer thicknesses, surface roughnesses of the bearing plate of 5 μm to 100 μm are suitable. The roughness of the surfaces was determined using a white-light interferometer or a stylus instrument.

A further means of supplying air or gas is to supply air or gas through the support plate. This can be achieved through the use of porous, open-pore support plates, or by means of support plates which possess a porous layer on the ceramicization contact side, or by support plates which have been provided with holes (e.g., drilled holes).

It has emerged that with support plates where the holes have a distance of 50 mm up to about 150 mm from one another, it is possible to produce an LAS glass-ceramic sheet having an amorphous low-Li zone which is at least 300 nm thick. The holes may have a diameter of 3 mm to 20 mm. Above a hole diameter of 20 mm, there is a risk of the glass sheet to be ceramicized sagging during the ceramicization, which is normally undesired, although for certain design effects may indeed be desirable. If the hole diameter is below 4 mm, then the distance between the holes has to be reduced significantly (e.g., 10 mm to 50 mm), and the number increased, but this lowers the strength of the support plate.

Preference is given to hole diameters of 5 mm to 15 mm in a hexagonal arrangement. The holes may be made in the support plates by the customary techniques, such as by drilling, laser cutting or perforation in the thermally softened state during the production of the support plate, for example.

In order for the air to pass as efficiently as possible through the holes (perforations) to the glass-ceramic sheet, the support plate may be mounted in such a way that the access of air to the holes on the bottom face of the support plate is ensured. This can be done by a hollow mounting of the support plate, by means of studs, strips and the like, on a further support plate with a closed surface.

Open-pore support plates which have a porosity of at least 2%, preferably 6%, are very effective in generating a low-Li surface zone, and layer thicknesses of up to 500 nm for the low-Li zone can be generated in the case of a low OH content in the kiln atmosphere, relative to that in the interior of the glass-ceramic material.

In order to prevent damage to the surface of the glass-ceramic sheet by sticking of the sheet to the support, plate or by scratches, it is possible to dispose a parting agent between support plate and glass-ceramic sheet. Examples of suitable parting agents are layers or known powders of oxides such as $Al_2O_3$, $SnO_2$, $TiO_2$, BN, $SiO_2$, $ZrO_2$, Fe oxide, Mg oxide, Mg silicate, or of metal layers such as Au, Pt, Rh or Ag. The parting layers can be applied to the support plates by means of known coating methods, as for example by sputtering, dipping, vapor deposition, screen printing, dusting on or spraying, for example. Typical layer thicknesses are between 0.2 μm and 100 μm. If powders are being applied, then thicker layers may also be sensible.

The table shows application examples for the minimum thickness of the low-Li surface zone on the bottom face in the case of smooth LAS glass-ceramic plates measuring 800 mm×600 mm×4 mm, ceramicized in the BQSS phase on support plates made of keatite glass-ceramic, with different surface structures.

TABLE 1

| Example | Structure of support surface | Roughness of support surface Rms (μm) | Minimum thickness of low-Li zone [nm] |
|---|---|---|---|
| 1* | smooth | 0.1 | 50 ± 20 |
| 2 | chemically etched | 1 | 100 ± 30 |
| 3 | sandblasted | 10-30 | 150-200 |
| 4 | studs, Ø = 1.5 mm, height 150 μm, distance 2 mm | 0.2 | 450 ± 50 |
| 5 | transverse grooves, width = 3 mm, depth = 0.5 mm, distance = 100 mm | 0.1 | 300 ± 30 |
| 6 | drill holes, Ø 6 mm, distance 100 mm | 0.1 | 320 ± 30 |
| 7 | drill holes, Ø 6 mm, distance 200-250 mm | 0.1 | 100 to 300 |

Example 1, marked *, is the reference example, with no specific surface conditioning of the support plate.

The present invention is illustrated further below, using working examples, and with reference to the appended figures. In the figures, identical reference numerals denote identical or corresponding elements.

FIG. 3 shows:

A temperature-time program of the invention, shown diagrammatically, for the ceramicization;

FIG. 4 shows:

Designated-value requirements for the transmission values at specified wavelengths in the visible spectral range, and also the transmission values of a glass-ceramic material produced by the method of the invention;

FIG. 5 shows:

Transmission and hazing of different glass-ceramic sheets as a result of different ceramicization parameters.

Illustrated in FIG. 3, by way of example, is a temperature-time program of the invention for the ceramicization of starting glasses, such as LAS starting glasses, for example, to form high-strength, transparent glass-ceramics. The starting-glass article provided undergoes a heating phase 1, in which it is heated to temperatures between 700 and 780° C., preferably 720 to 750° C., in this example 735° C. In the nucleation phase 2, the article remains in this temperature range for preferably 30 to 60 minutes, more preferably 40 to 50 minutes, 45 minutes as shown here.

This is followed by a further heating phase 3, in which the starting glass article with the crystallization nuclei generated is heated to 820 to 850° C., with a temperature gradient or heating rate of 0.9 to 2.3° C./min being operated. During this heating phase, a large part of the crystallization takes place, and more particularly at least 50% by volume, more particularly at least 60% by volume, of the total crystals in the completed glass-ceramic article are formed during this heating phase 3.

After a large part of the desired crystals or crystallites have been formed, the maximum-temperature phase 4 then follows, in which the at least partly crystallised article is first heated, in a period encompassing 5 to 15 minutes, preferably 8 to 12 minutes, and 10 minutes as shown here, to a temperature in the range between 800 and 900° C., more preferably between 865 and 875° C., 870° C. as shown here, and secondly remains for a certain time in this temperature range.

The purpose of the maximum-temperature phase 4 is to prevent or reduce residual stresses in the crystallized article.

The ceramicized article is subsequently cooled at not less than 5° C./minute and not more than 20° C./minute-14° C./minute as shown here (cooling phase 5). In this cooling phase, the glass-ceramic article is cooled to temperatures of at least 600° C., but preferably to even lower temperatures. In contrast to the method shown here, it is also possible for the cooling phase 5 to proceed very rapidly only temporarily, as for example at the beginning of cooling, whereas later a lower cooling rate is operated.

Especially when LAS starting glasses are used, this method produces a high-transparency glass-ceramic material whose properties allow it to be used, inter alia as a viewing screen, for vehicles, for instance.

FIG. 4 shows the designated-value requirements for the transmission values (large circles blocked out in gray) on irradiation with a CIE standard illuminant D65 in the visible spectrum, and also the transmission values achieved by an inventively produced glass-ceramic sheet with a thickness of 5 mm, the values recorded having been standardised for a thickness of 4 mm. The small gray circles show the transmission values of the crystalline interior; the black squares show the transmission values in the marginal region of the glass-ceramic sheet. In the overall visible spectrum, both in the central region and in the marginal region of the glass-ceramic sheet of the invention, the transmission value requirements are met that is, the transmission values are above 0.75, and even above 0.90 from a wavelength of 600 nm.

FIG. 5 shows the transmission and the hazing, standardised to a 4 mm sheet thickness, of three glass-ceramic sheets produced by a procedure slightly varied, in each case. It is notable that the transmission curve profile for all three sheets is very similar or virtually identical.

In contrast, the scattering of the glass-ceramic sheet denoted as sample A exhibits significantly higher values, more particularly in the range between 400 and 460 nm wavelength, than the sheets denoted as samples B and C. All three samples were produced by the method of the invention, with the exception of sample A, which during the maximum-temperature phase 4 was exposed only to a temperature of 820° C. Samples B and C, in contrast, were treated in the maximum-temperature phase 4 with the inventive temperature of 870° C. The difference in respect of hazing between the samples is striking, and demonstrates the importance of a very precisely controlled temperature regime particularly in this phase of the method.

Measurements of the lattice constants of the samples showed differences in lattice constant a, which was 5.18328 Å and 5.18406 Å for samples B and C, respectively, which exhibit little hazing, whereas sample A has not only a relatively high hazing but also a higher lattice constant a of 5.1906 Å. The lattice constant c as well, with 5.4410, is lower fox samples B and C than for sample A, which exhibits a lattice constant c of 5.4412. Furthermore, the volume of the unit cells of sample A as well, at 1269.572 Å3, is greater than the volume of sample E, at 1265.958 Å3, and sample C, at 1266.328 Å3. With particular advantage in respect of low scattering on the part of the completed glass-ceramic article, therefore, the beta-quartz solid solutions in the crystalline interior region thus have a lattice constant a in the range between 5.18 and 5.19 Å.

The production methods of samples B and C differ from one another only in respect of the somewhat different nucleation temperatures during the nucleation phase 2. The resulting different hazing values, particularly in the wavelength range from 400 to 500 nm, demonstrate that the temperature regime during the nucleation phase 3 as well has an influence on the optical quality of the glass-ceramic sheet produced. It must be stated, however, that the temperature regime during this phase of the method is less critical than during the subsequent maximum-temperature phase 4.

Figure 1:
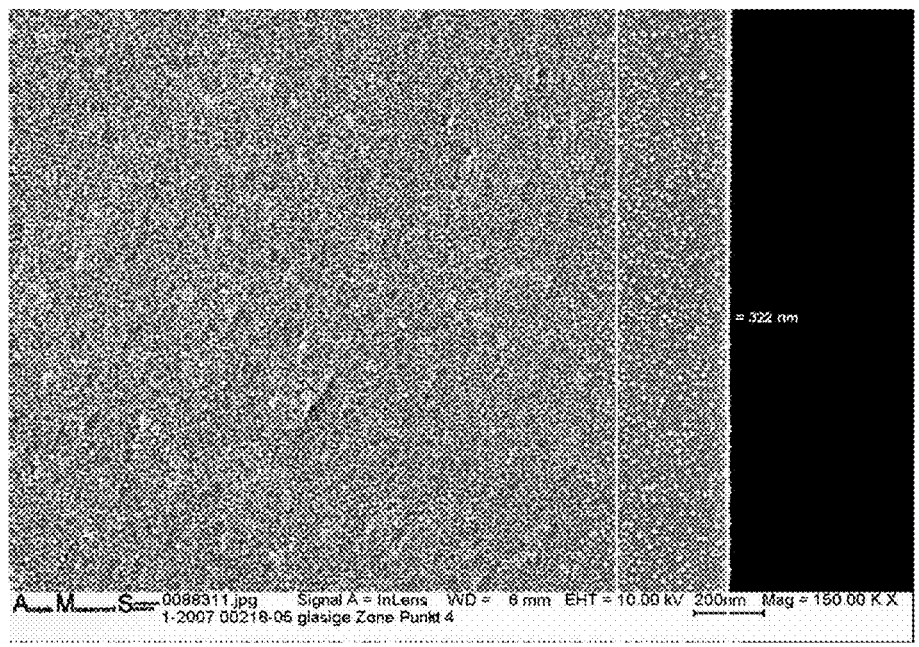
FIG. 1 shows an SEM of the glass ceramic and the structural differences between the crystalline interior and vitreous surface.
Figure 2:
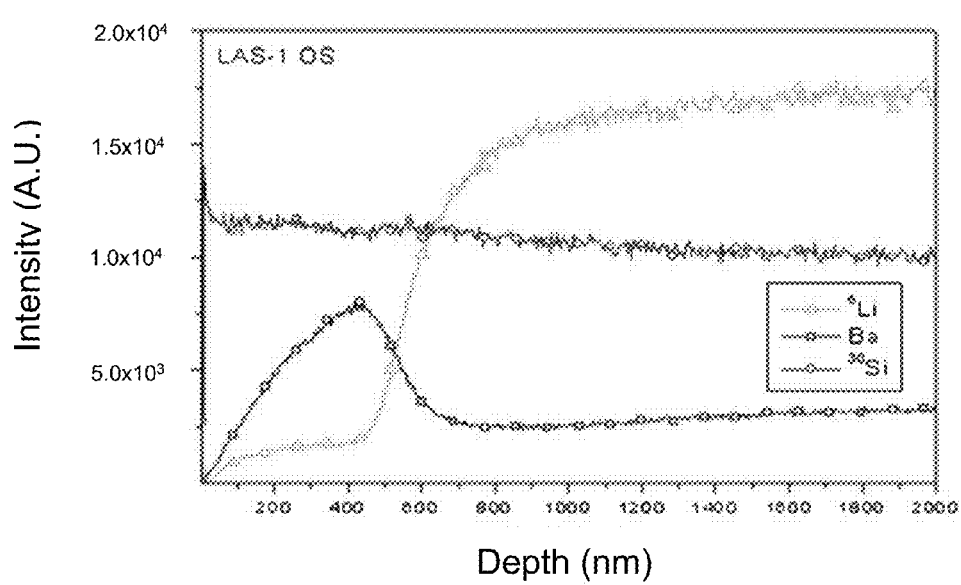
FIG. 2 shows a SIMS depth profile of the top face of an LAS glass ceramic according to the invention.
Figure 3:
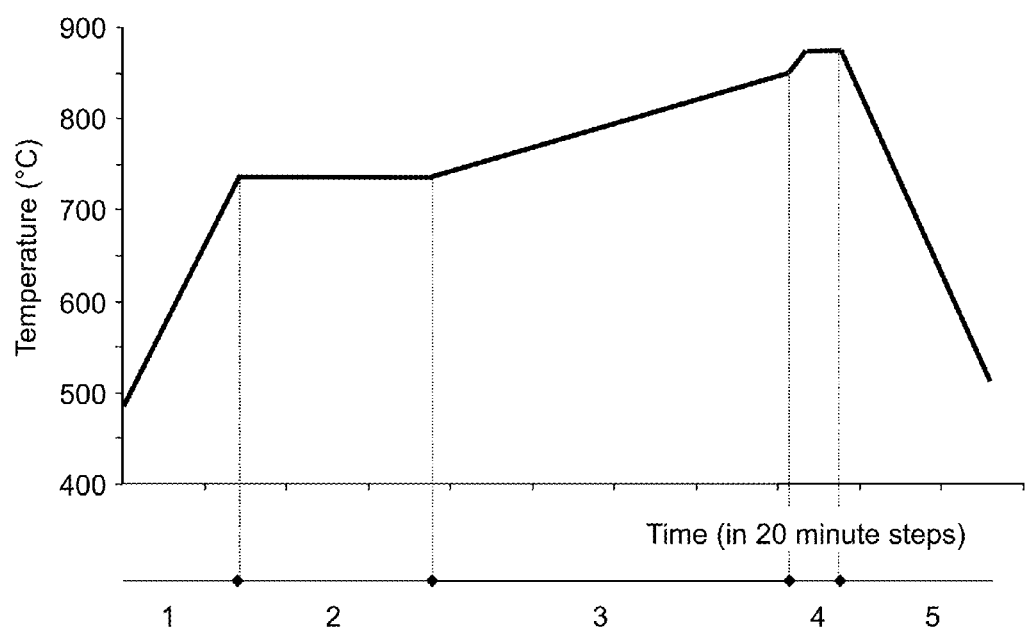
FIG. 3 shows a temperature-time program of ceramicization of the present invention.
Figure 4:
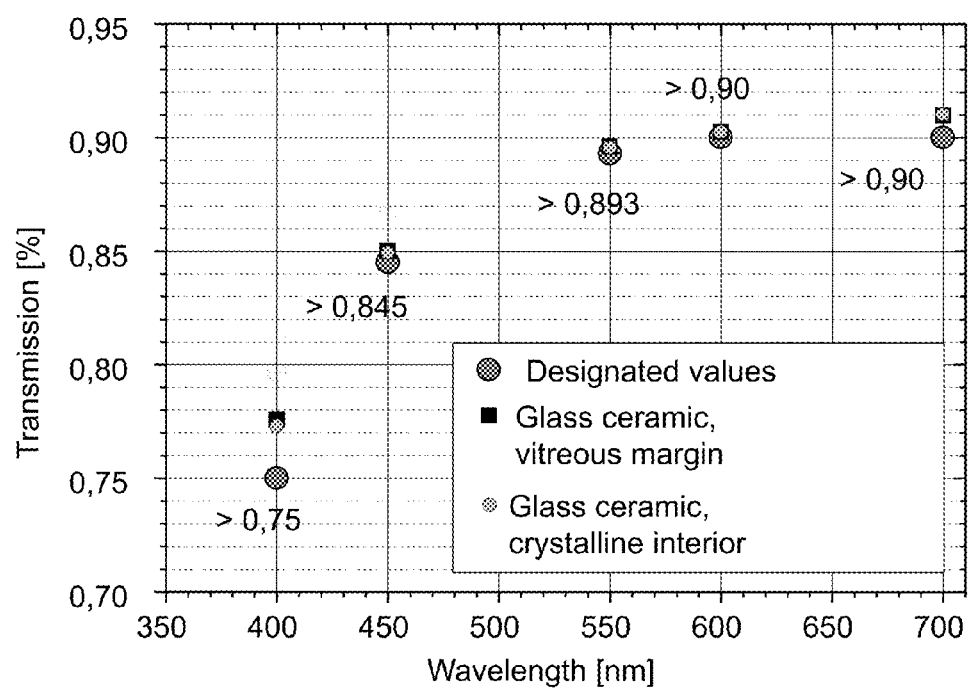
FIG. 4 shows the visible transmission values of a glass ceramic made by the method of the invention.
Figure 5:
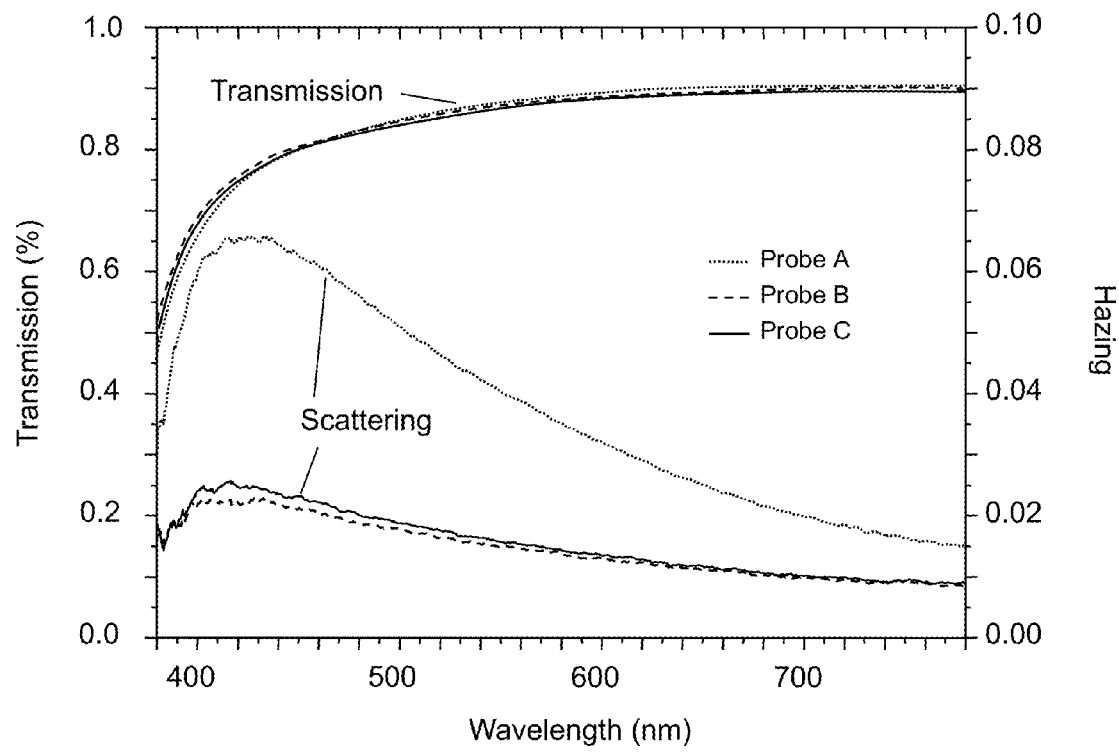
FIG. 5 shows the transmission and hazing of the different glass ceramic sheets as a result of different ceramization parameters.

The invention claimed is:

1. A lithium-containing, transparent glass-ceramic material comprising an amorphous, lithium depleted, predominantly vitreous surface zone that is at least 50 nm thick on all sides and surrounds a crystalline interior, wherein the vitreous surface zone is connected to the crystalline interior by a transition region, and wherein the vitreous surface zone has a consistent thickness on all sides.

2. The glass-ceramic material of claim 1, wherein the vitreous surface zone has a thickness of 50 to 5000 nm.

3. The glass-ceramic material of claim 1, wherein the thickness is not more than 200 nm.

4. The glass-ceramic material of claim 1, comprising a principal crystal phase of more than 50% by weight of beta-quartz solid solutions.

5. The glass-ceramic material of claim 4, wherein the beta-quartz solid solutions have a lattice constant from 5.18 A to 5.19 A.

6. The glass-ceramic material of claim 1, wherein the vitreous surface zone comprises not more than 10% by weight of crystals and the crystalline interior comprises at least 50% by weight of crystals.

7. The glass-ceramic material of claim 4, further comprising a refractive index difference between a glass phase and the principal crystal phase, in a range between 0.001 and 0.05.

8. The glass-ceramic material of claim 1, wherein the vitreous surface zone has a lower refractive index than the crystalline interior.

9. The glass-ceramic material of claim 1, further comprising a difference in refractive indices between a residual glass phase of the vitreous surface zone and a crystal phase of the interior that is between +/−0.3.

10. The glass-ceramic material of claim 1, wherein the high transmission is greater than 0.75 at 400 nm in the visible wavelength range based on a wall thickness of 4 mm.

11. The glass-ceramic material of claim 1, wherein the glass-ceramic comprises nucleating agents selected from the group consisting of $TiO_2$, $ZrO_2$, $SnO$, and combinations of $TiO_2$ and $ZrO_2$.

12. The glass-ceramic material of claim 1, further comprising crystals having a uniform distribution in the interior and particle sizes that deviate between +/−5%.

13. The glass-ceramic material of claims 1, wherein the glass-ceramic material comprises a ceramicized lithium aluminosilicate (LAS) glass.

14. The glass-ceramic material of claim 1, further comprising a compositional range, in % by mass, of:
50-75.0 $SiO_2$,
15-28.0 $Al_2O_3$,
0-2.0 $B_2O_3$,
0-1.0 F,
2.0-6.0 $Li_2O$,
0-6.5 $CaO + SrO + BaO$,
0-7.0 $TiO_2$,
0-5.0 $ZrO_2$,
0-4.0 $ZnO$,
0-3.0 $Sb_2O_3$,
0-3.0 $MgO$,
0-3.0 $SnO_2$,
2.0-7.0 $TiO_2 + ZrO_2 + SnO_2$,
0-8.0 $P_2O_5$,
0-1.5 $As_2O_3$,
0-1.0 $Nd_2O_3$,
0-4.0 $Na_2O + K_2O$, the respective fractions being situated within the ranges indicated hereinafter,
0-4.0 $Na_2O$,
0-4.0 $K_2O$, and
a water content of 0.01%-0.08% by mass.

15. The glass-ceramic material of claim 14, further comprising an $Fe_2O_3$ content of 0.007% to 1.00% by weight.

16. The glass-ceramic material of claim 1, wherein the vitreous surface zone is formed in a kiln atmosphere having a controlled OH and/or hydrogen content of between 1% to 20% by volume.

17. The glass-ceramic material of claim 16, wherein the controlled OH and/or hydrogen content comprises $H_2O$.

18. The glass-ceramic material of claim 1, wherein the vitreous surface zone is formed in a kiln atmosphere having a controlled OH and/or hydrogen content of between 0.1% to 1% by volume.

19. The glass-ceramic material of claim 18, wherein the controlled OH and/or hydrogen content comprises $H_2O$.

20. A lithium-containing, transparent glass-ceramic material comprising an amorphous, lithium depleted, predominantly vitreous surface zone having a consistent thickness on all sides that is more than 1500 nm and less than 5000 nm thick and surrounds a crystalline interior, wherein the vitreous surface zone is connected to the crystalline interior by a transition region.

* * * * *